United States Patent [19]

Kohayakawa et al.

[11] 4,336,093

[45] Jun. 22, 1982

[54] METHOD OF STACKING METAL SHEET MATERIALS

[75] Inventors: Ken Kohayakawa; Hisao Ohba; Atuhiro Sano, all of Shizuoka, Japan

[73] Assignee: Fuji Photo Film Co., Ltd., Kanagawa, Japan

[21] Appl. No.: 177,960

[22] Filed: Aug. 14, 1980

[30] Foreign Application Priority Data

Aug. 15, 1979 [JP] Japan ................................ 54-103903

[51] Int. Cl.$^3$ ........................ B32B 31/04; B32B 31/18

[52] U.S. Cl. ...................................... 29/399; 250/326; 361/225; 428/922

[58] Field of Search ............... 156/272, 380, 250, 510; 361/225; 428/922; 250/325, 326

[56] References Cited

U.S. PATENT DOCUMENTS

| | | | |
|---|---|---|---|
| 3,054,708 | 9/1962 | Steinberg | 156/272 |
| 3,318,751 | 5/1967 | Ungerer et al. | 156/380 |
| 3,350,247 | 10/1967 | Steinberg | 156/272 |
| 3,354,015 | 11/1967 | Klusmire et al. | 428/922 |
| 3,892,614 | 7/1975 | Levy | 156/272 |

*Primary Examiner*—Michael G. Wityshyn
*Attorney, Agent, or Firm*—Sughrue, Mion, Zinn, Macpeak & Seas

[57] ABSTRACT

A method of stacking metal sheet materials which is characterized by interposing between each adjacent metal sheet material an interleaf comprising paper with plastic coated on only one side.

8 Claims, 3 Drawing Figures

METHOD OF STACKING METAL SHEET MATERIALS

BACKGROUND OF THE INVENTION

1. Field of the Invention

This invention relates to a method of stacking metal sheet materials, particularly photosensitive printing plate precursors.

2. Description of the Prior Art

In conventional lithography, a photosensitive printing plate precursor comprising a metal support, such as an aluminum plate having a hydrophilic surface, with a photosensitive layer thereon is imagewise exposed and processed with a developer to form a resist layer from which exposed areas or unexposed areas have been removed. The printing plate thus prepared is set in a printing machine and used with oily ink placed on the plate after applying dampening water to the exposed hydrophilic metal surface having no resist layer.

Photosensitive lithographic printing plate precursors are cut to a predetermined size, stacked on top of each other and packed in a predetermined number for shipment. Photosensitive lighographic printing plate precursors or printing plates prepared therefrom are also usually stacked on top of each other for storage prior to use. in either case, adjacent precursors or plates have interposed therebetween a protective interleaving paper sheet or some other type of interleaf that intimately contacts the surface of the photosensitive layer or plate. One example of a material for such an interleaf is paper coated with plastic on both sides.

In conventional techniques, intimate contact between an interleaf and the surface of the photosensitive layer of an uncut or cut photosensitive printing plate precursor is obtained electrostatically by applying a high voltage to the surface of the photosensitive layer. Details of such a method and apparatus for implementing this technique are given in German Patent Applications (OLS) Nos. 1,452,935 and 1,552,110. However, residual static electricity of high voltage often accumulates on interleaves made of paper with plastic coated on both sides to give an electric shock to users or persons who handle the stacked precursors.

SUMMARY OF THE INVENTION

As a result of research to solve the above problem with conventional interleaves, we have found that an interleaf of good characteristics can be prepared from paper with plastic coated on one side only.

Therefore, this invention provides a method of stacking photosensitive lithographic printing plate precursors having a photosensitive layer on a metal support characterized by interposing between adjacent precursors an interleaf comprising paper with plastic coated on only one side thereof. It could be easily understood that the method of this invention is applicable not only to the stacking of both printing plates and photosensitive precursors but also to metal sheet materials comprising a metal in general and is also applicable to stacking which does not involve the application of a high voltage to provide intimate contact between the metal sheet material and the interleaf, though such a high voltage can be used.

BRIEF DESCRIPTION OF THE DRAWINGS

In FIG. 1, the plastic coating faces the photosensitive layer, and in FIG. 2, the interleaf contacts the photosensitive layer on the paper side.

DETAILED DESCRIPTION OF THE INVENTION

Figure 1:
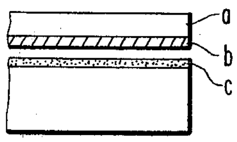
FIGS. 1 and 2 are partical sectional views showing how an interleaf with plastic coated on only one side of the paper is placed in close contact with the photosensitive layer of a photosensitive printing plate precursor.

This invention will be explained in detail hereinbelow in relation to a presensitized plate.

Suitable metal supports for use in this invention include an aluminum plate, copper plate, steel plate and other metal plates as are conventionally used as a base for a printing plate. Generally, these metal plates are subjected to a surface treatment to render the surface thereof hydrophilic. Taking the example of an aluminum plate, such is subjected to suitable combinations of degreasing or cleaning of the surface thereof, anodization, physical or electrochemical graining, and chemical etching. Various techniques are known to achieve such surface treatments, and all of them can be used in the practice of this invention.

The metal support having a hydrophilic surface is optionally overlaid with a subbing layer before applying a photosensitive composition thereon to form a photosensitive layer. Many types of photosensitive compositions are known, for example, those consisting essentially of a photopolymer and those comprising a photosensitive diazo compound. These compositions may be positive-working or negative-working, and either type can be used in the formation of a photosensitive layer. Illustrative compositions suitable for the photosensitive layer are explained in greater detail in published British Patent Application No. 2020309A. Many techniques are known to prepare a solution from which a subbing layer or photosensitive layer can be formed and there are also many known techniques for applying such solutions and drying and such can be used in the practice of the present invention.

Precursors prepared by forming a photosensitive layer on a metal support are cut to the desired size and stacked one on top of another with an interleaf placed between adjacent precursors. Alternatively, an interleaf is placed between uncut precursors. This invention relates to the construction of such an interleaf and the method of stacking photosensitive printing plate precursors using such an interleaf.

The interleaf used in the practice of this invention comprises paper with plastic coated on only one side.

Suitable materials for the paper are wood pulp, nautral fibers such as hemp, and synthetic pulp produced from linear polymers such as polyolefin, which may be mixed with synthetic fibers or regenerated cellulose. These materials may contain additives conventionally used in paper making in conventional proportions, for example, a filler such as clay, talc, or titanium white; a wet strength improving agent such as a melamine resin or a polyamide or a polyamine-epichlorohydrin resin; and a dry strength improving agent such as a starch or polyacrylamide.

Suitable plastics with which the paper is coated are α-olefin polymers. Preferred examples thereof are polymers of α-olefins having 2 to 10 carbon atoms such as polyethylene, polypropylene and ethylene-butene copolymer; high density polyethylene is particularly preferred.

Such plastics may be applied to paper by either coating or laminating, and extrusion coating is preferred. In extrusion coating, a film of molten polyolefin is cast onto the moving paper, and the polyolefin on the paper is cured to set. The layer of plastic can be formed in a thickness that varies over a wide range, and generally it is in the range of from about 2 to about 50 microns, preferably from 5 to 20 microns.

Figure 2:
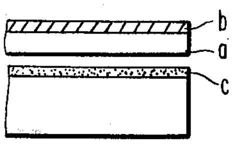

The interleaf thus-prepared is placed on the photosensitive printing plate precursor in the manner shown in FIGS. 1 and 2. In FIG. 1, the interleaf is placed on the precursor in such a manner that the photosensitive layer c is in intimate contact with the plastic coating b of the interleaf. In FIG. 2, the paper substrate a of the interleaf is in contact with the photosensitive layer c.

The interleaf can be superimposed on the photosensitive precursor in either of the two manners shown in FIGS. 1 and 2, but the embodiment of FIG. 1 is preferred because it provides better protection for the photosensitive layer and a number of precursors with interleaves placed between adjacent ones can be easily and neatly cut by a blade into any desired size.

The stacking method of this invention is used with particular advantage to provide intimate contact between an interleaf and a photosensitive printing plate precursor by generating an electric field between them according to the methods described in Japanese Patent Publication Nos. 6544/63, 458/68, German Patent Application (OLS) Nos. 1,452,935 and 1,552,110. One defect with the methods described in these publications is that an electric charge given to an interleaf comprising paper with both sides coated with a plastic such as polyethylene remains for an exceptionally long period of time; such defect is eliminated using the interleaf of this invention and the electric charge generated by those methods remains on the interleaf only for the period necessary to provide intimate contact with the photosensitive layer.

Figure 3:
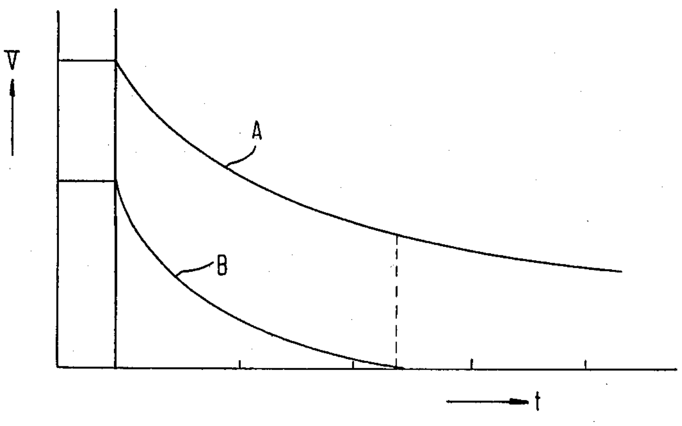
FIG. 3 is a graph showing the relationship between time (t) and charge voltage (V) for the combination of a photosensitive precursor and an interleaf which has been brought into intimate contact with the precursor electrostatically.

FIG. 3 is a graph showing the relationship between time (t) plotted on the x-axis and charge voltage (V) plotted on the y-axis for a photosensitive lithographic printing plate precursor comprising an aluminum plate in intimate contact with an interleaf coated with polyethylene and electrified by corona discharge. In the figure, curve A shows time versus voltage for the case wherein both sides of the interleaf were coated with polyethylene while curve B shows time versus voltage for the case wherein only one side of the interleaf was coated with polyethylene. The graph clearly shows that electric charge does not remain as long on the interleaf with polyethylene coated on one side as on the interleaf with polyethylene coated on both sides.

One great advantage of this invention is that due to the shortness of the period during which electric charge remains on the interleaf, persons who stack photosensitive printing plate precursors or workers who prepare printing plates from the precursors are protected from the hazard of electric shock. As another advantage, the use of an interleaf comprising paper with plastic coated on one side permits a number of precursors to be cut easily and neatly with a blade type or other cutting machine.

The present invention is further illustrated by the following Example, but the present invention is not limited thereto.

EXAMPLE

1 Part of polyhydroxyphenyl naphthoquinone-1,2-diazide-5-sulfonate obtained by the polycondensation of acetone and pyrogallol described in Example 1 of U.S. Pat. No. 3,635,709 and 2 parts of a novolak-type phenol-formaldehyde resin were dissolved in 20 parts of 2-methoxyethyl acetate and 20 parts of methyl ethyl ketone to form a light-sensitive solution. A grained aluminum plate having a thickness of 0.3 mm was electrolytically oxidized to form an oxide coating at a rate of about 2 g/m$^2$, washed well, and dried. The light-sensitive solution was coated on the aluminum plate, and dried to form a positive working presensitized plate having a light-sensitive layer at a rate of about 2.5 g/m$^2$. The PS plate was cut into a number of 1,003×800 mm pieces.

Separately, an interleaf A was prepared by coating one side of the paper weighing 50 g with a high density polyethylene (density, 0.95) in a thickness of 10μ, and also an interleaf B was prepared by coating both sides of the above paper with the same polyethylene as used above each in a thickness of 10μ.

Each of the interleaf A and B was stacked on the above prepared presensitized plate and corona discharge was applied at a voltage of −40 KV from the interleaf side whereby the interleaf and the presensitized plate were intimately contacted. The charge voltage was measured immediately after stopping the corona discharge, after 20 seconds and 1 minute, and the results obtained were shown in Table below.

TABLE

| | Charge Voltage (mV) | | |
|---|---|---|---|
| | Immediately After Stopping Corona Discharge | After 20 seconds | After 1 Minute |
| Interleaf A* | | | |
| Case 1 | 38 | 4 | ~0 |
| Case 2 | 35 | 21 | 15 |
| Interleaf B | 67 | 39 | 24 |

*Case 1:
Interleaf A was stacked on the presensitized plate in such a manner that the polyethylene layer of Interleaf A was contacted with the photosensitive layer of presensitized plate.
Case 2:
Interleaf A was stacked on the presensitized plate in such a manner that non-coated paper side of Interleaf A was contacted with the photosensitive layer of presensitized plate.

The above results clearly indicate that the interleaf A having the coated polyethylene layer on both surfaces possessed a high charge voltage even 1 minute after stopping the corona discharge, whereas the interleaf B having the coated polyethylene layer on one surface exhibited a low charge voltage 1 minute after stopping the corona discharge and, in particular, in the case where the polyethylene layer of interleaf B was contacted with the photosensitive layer of presensitized plate (Case 1), the charge voltage after 1 minute was found to be substantially 0 mV.

Then, the stacked 50 sets each comprising the presensitized plate and the interleaf A or B supperimposed as above were cut by a blade into a half size, and the cutting could be effected neatly in each case.

While the invention has been described in detail and with reference to specific embodiments thereof, it will be apparent to one skilled in the art that various changes and modifications can be made therein without departing from the spirit and the scope thereof.

What is claimed is:

1. In a method for stacking and cutting photosensitive printing plate precursors which comprise a photosensitive layer on a metal support, said method comprising intimately contacting an interleaf with a photosensitive printing plate precursor by applying electric charges for establishing electric fields between the interleaf and the precursor, stacking a number of the resulting precursors intimately contacted with the interleaf in a manner so that the interleafs are between adjacent precursors, and then cutting the stacked precursors into a desired size, the improvement wherein said interleaf comprises paper with plastic coated on only one side of said paper and said interleaf is placed on the photosensitive printing plate precursor in such a manner that the photosensitive layer of said precursor is in intimate contact with the plastic coating of said interleaf.

2. The method of claim 1, wherein said plastic is an α-olefin polymer.

3. The method of claim 2, wherein said polymer is a polyethylene, a polypropylene or an ethylene-butene copolymer.

4. The method of claim 2, wherein said polymer is a high density polyethylene.

5. The method of claim 4, wherein said polymer has a thickness of 5 to 20 microns.

6. The method of claim 1, wherein said plastic is coated on the paper in a thickness of about 2 to about 50 microns.

7. The method of claim 6, wherein the thickness is from 5 to 20 microns.

8. The method of claim 1, wherein said metal support is an aluminum support.

* * * * *